US006703887B2

(12) United States Patent
Groe

(10) Patent No.: US 6,703,887 B2
(45) Date of Patent: Mar. 9, 2004

(54) LONG TIME-CONSTANT INTEGRATOR

(75) Inventor: John B. Groe, Poway, CA (US)

(73) Assignee: Sequoia Communications, San Diego, CA (US)

( * ) Notice: Subject to any disclaimer, the term of this patent is extended or adjusted under 35 U.S.C. 154(b) by 0 days.

(21) Appl. No.: 10/233,161

(22) Filed: Aug. 30, 2002

(65) Prior Publication Data

US 2003/0080798 A1 May 1, 2003

Related U.S. Application Data

(60) Provisional application No. 60/316,781, filed on Aug. 31, 2001.

(51) Int. Cl.[7] .................... G06F 7/64

(52) U.S. Cl. .................... 327/344; 327/551

(58) Field of Search .................... 327/336, 337, 327/339, 341, 344, 551–554, 557–559, 561

(56) References Cited

U.S. PATENT DOCUMENTS 4,926,135 A * 5/1990 Voorman .................... 330/107
5,444,777 A * 8/1995 Condon et al. .................... 379/413
6,060,935 A * 5/2000 Shulman .................... 327/345
6,163,207 A * 12/2000 Kattner et al. .................... 327/553
6,476,660 B1 * 11/2002 Visocchi et al. .................... 327/336

OTHER PUBLICATIONS

Adel S. Sedra "Microelectronic Circuits" 4th Edition 1988, pp. 73–76, Oxford Univ. Press, Ny.

* cited by examiner

*Primary Examiner*—Minh Nguyen

(57) ABSTRACT

A differential integrator that uses a matched resistor array to reduce integrating currents and thereby realize a long time constant. The differential integrator includes a differential operational amplifier having inverting and noninverting amplifier input terminals, and inverting and noninverting amplifier output terminals, the amplifier output terminals form inverting and noninverting output terminals, respectively, of the differential integrator. The differential integrator also includes a noninverting differential integrator input terminal and an inverting differential integrator input terminal. The differential integrator also includes a resistor array that couples the noninverting differential integrator input terminal to the inverting and noninverting input terminals of the amplifier, and the resistor array also couples the inverting differential integrator input terminal to the inverting and noninverting input terminals of the amplifier.

7 Claims, 2 Drawing Sheets

"Prior Art"

"Prior Art"

"Prior Art"

LONG TIME-CONSTANT INTEGRATOR

CROSS REFERENCE TO RELATED APPLICATIONS

This application claims the benefit of priority of a co-pending U.S. Provisional Patent Application entitled "Long Time-Constant Intergrator" Ser. No. 60/316,781 filed on Aug. 31, 2001, the disclosure of which is incorporated by reference herein in its entirety for all purposes.

FIELD OF THE INVENTION

The present invention relates generally to integrators, and more specifically to an integrator with a long time constant.

BACKGROUND OF THE INVENTION

The integrator is a key building block for analog signal processing. It attenuates high-frequency signals, shapes low-frequency signals, and tracks DC levels.

FIG. 1 shows a conventional operational amplifier integrator. The resistor (R) converts the input voltage $v_{in}$ to a current that can be expressed as:

$$i_{in} = \frac{v_{in} - V_{(-)}}{R}$$

where $V_{(-)}$ is the voltage at the inverting terminal of the operational amplifier. The operational amplifier's large gain forces the voltages at its input terminals $V_{(-)}$ and $V_{(+)}$ to be equal, while its high input impedance directs the input current $i_{in}$ to the capacitor. This causes a voltage to be developed across the capacitor (C) given by:

$$v_c = \frac{1}{C}\int i_{in} dt$$

with;

$$v_{out} = -v_C = \frac{1}{RC}\int v_{in} dt$$

where RC is the time constant of the integrator.

A typical integrator uses large-valued resistors and capacitors to realize a long time constant, making it difficult to implement in monolithic form. As a result, off-chip capacitors are used or shorter time constants with some compromise are substituted.

The above integrator operates continuously as opposed to the switched-capacitor integrator shown in FIG. 2. The switched-capacitor integrator is a discrete-time circuit that is capable of long time constants. During operation, when the switch is connected to the input, the input voltage $v_{in}$ charges capacitor $C_1$. The charge $Q_{C1}$ stored by the capacitor $C_1$ is simply equal to:

$$Q_{C1} = C_1 v_{in}$$

When the switch is connected to the inverting input of the operational amplifier, the capacitor $C_1$ is discharged to ground through capacitor $C_2$. (Since the large gain of the operational amplifier drives its inverting terminal to be equal to its noninverting terminal.) That is, for each cycle of the switch, a packet of charge is transferred from the input to the integrating capacitor $C_2$. The equivalent input current is therefore equal to:

$$I_{eq} = Q_{C1} f_s = C_1 f_s v_{in}$$

where $f_s$ is the switching frequency. This results in an equivalent resistance ($R_{eq}$) of:

$$R_{eq} = \frac{v_{in}}{I_{eq}} = \frac{1}{C_1 f_s}$$

As with any discrete-time system, the switching frequency must be several times higher than the highest input frequency. However, by their nature, switched capacitor circuits generate switching noise that can affect other circuits and produce discrete-time outputs that typically require filtering to smooth the steps between discrete values.

It would therefore be advantageous to have a continuous-time integrator using nominal-valued components to achieve a long time constant.

SUMMARY OF THE INVENTION

The present invention includes a differential integrator circuit that uses a resistor array to reduce integrating current and thereby realize a long time constant. The performance of the circuit is based on resistor matching—a strong property in monolithic circuits—and nominal-valued components to achieve the long time constant.

In one embodiment of the invention, a long time-constant differential integrator is provided that comprises a differential operational amplifier having inverting and noninverting amplifier input terminals, and inverting and noninverting amplifier output terminals, and the output terminals form inverting and noninverting output terminals, respectively, of the differential integrator. The differential integrator also comprises a noninverting differential integrator input terminal and an inverting differential integrator input terminal. The differential integrator also comprises a resistor array that couples the noninverting differential integrator input terminal to the inverting and noninverting input terminals of the amplifier, and the resistor array also couples the inverting differential integrator input terminal to the inverting and noninverting input terminals of the amplifier.

In one embodiment, a long time-constant differential integrator is provided that comprises a differential operational amplifier having inverting and noninverting amplifier input terminals, and inverting and noninverting amplifier output terminals, and wherein the amplifier output terminals form inverting and noninverting output terminals, respectively, of the differential integrator. The differential integrator also comprises a noninverting differential integrator input terminal and an inverting differential integrator input terminal. The differential integrator also comprises a resistor array that couples the noninverting differential integrator input terminal to the inverting and noninverting input terminals of the amplifier, and the resistor array also couples the inverting differential integrator input terminal to the inverting and noninverting input terminals of the amplifier.

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION

Figure 1:
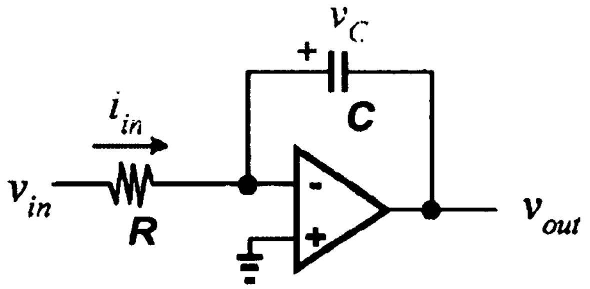
FIG. 1 shows a diagram of a continuous-time operational amplifier integrator.
Figure 2:
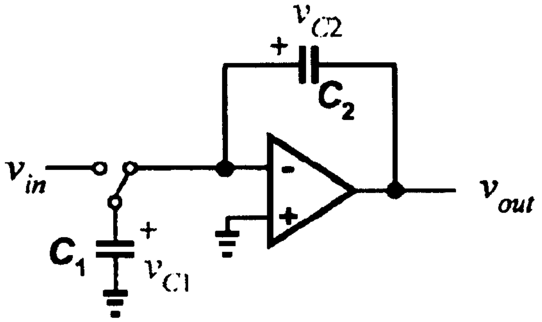
FIG. 2 shows a diagram of a switched-capacitor, discrete-time integrator.
Figure 3:
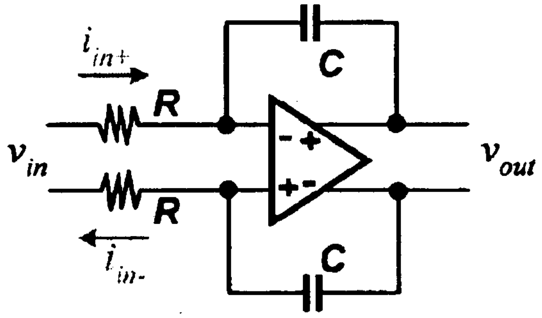
FIG. 3 shows a diagram of a differential integrator.

FIG. 3 shows a differential integrator that converts a differential input voltage to two charging currents $i_{in+}$ and $i_{in-}$ that are equal to:

$$i_{in+} = \frac{v_{in+} - V_{cm}}{R_1} \qquad i_{in-} = \frac{v_{in-} - V_{cm}}{R_2}$$

where the common mode voltage $V_{cm}$ is the mean of the two input voltages, lies equidistant between them, and can be expressed as:

$$V_{cm} = \frac{1}{2}(v_{in+} + v_{in-})$$

The two input voltages can be rewritten as $v_{in+}=V_{cm}+\Delta v_{in}$ and $v_{in-}=V_{cm}-\Delta v_{in}$ where $\Delta v_{in}$ is the actual differential input voltage. This means that $i_{in-}$ and $i_{in-}$ are opposite polarities with;

$$i_{in+} = \frac{\Delta v_{in}}{R_1} \qquad i_{in-} = -\frac{\Delta v_{in}}{R_2}$$

Figure 4:
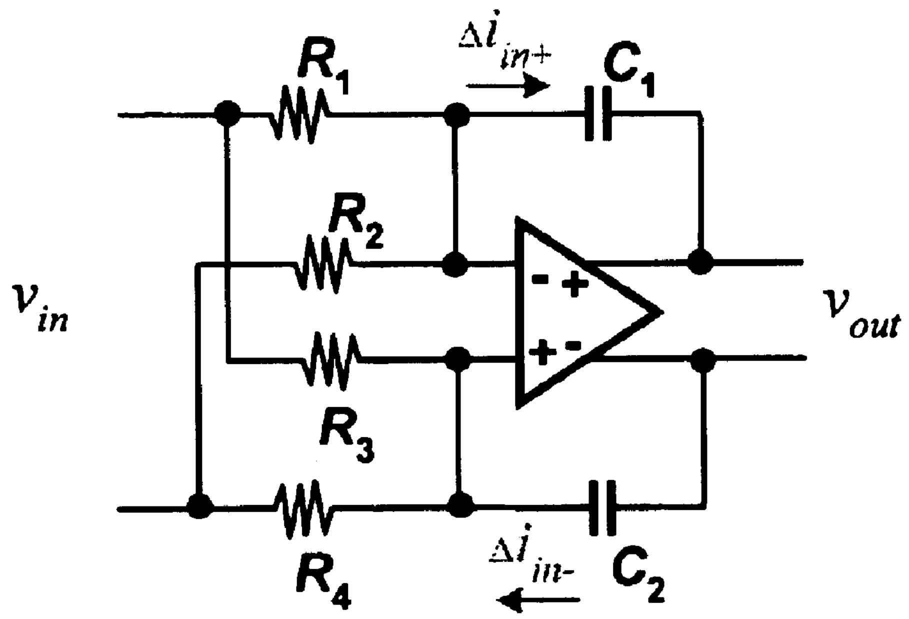
FIG. 4 shows a detailed schematic of one embodiment of a differential integrator and resistor array that realizes a long time constant in accordance with the present invention.

FIG. 4 shows a detailed schematic of one embodiment of a differential integrator 400 that includes a resistor array 402 to realize a long time constant in accordance with the present invention. The actual integrating currents applied to capacitors $C_1$ and $C_2$ are reduced using the resistor array 402. The integrating current associated with capacitor $C_1$ is given by:

$$i_{CI} = \frac{\Delta v_{in}}{R_1} - \frac{\Delta v_{in}}{R_2}$$

where $R_1$ is slightly smaller than $R_2$. If $R_2$ is set to $R_2=(1+\epsilon)R_1$ and $\epsilon<<1$, then the above equations becomes:

$$i_{CI} = \frac{\Delta v_{in}}{R_1} - \frac{\Delta v_{in}}{(1+\varepsilon)R_1}$$

which can be simplified and expressed as:

$$i_{CI} = \frac{\Delta v_{in}}{\left(\frac{1+\varepsilon}{\varepsilon}\right)R_1}$$

The voltage developed across capacitor $C_1$ can therefore be expressed as:

$$v_{CI} = \frac{1}{\left(\frac{1+\varepsilon}{\varepsilon}\right)R_1 C_1} \int \Delta v_{in} dt$$

As a result, the integrator time constant is increased by the factor.

$$\frac{1+\varepsilon}{\varepsilon}.$$

A similar analysis shows identical results for capacitor $C_2$ with regards to resistors $R_3$ and $R_4$. For example, R1 is matched with R4 and R2 is matched with R3, so that their ratios remain constant.

The novel long time-constant integrator of FIG. 4 utilizes the difference between two resistors to reduce the integrating current. As such, resistor matching is used. In monolithic circuits, resistor matching errors are typically less than 1%, allowing time constant increases better than 20 times. This benefit is illustrated in FIG. 5.

Figure 5:
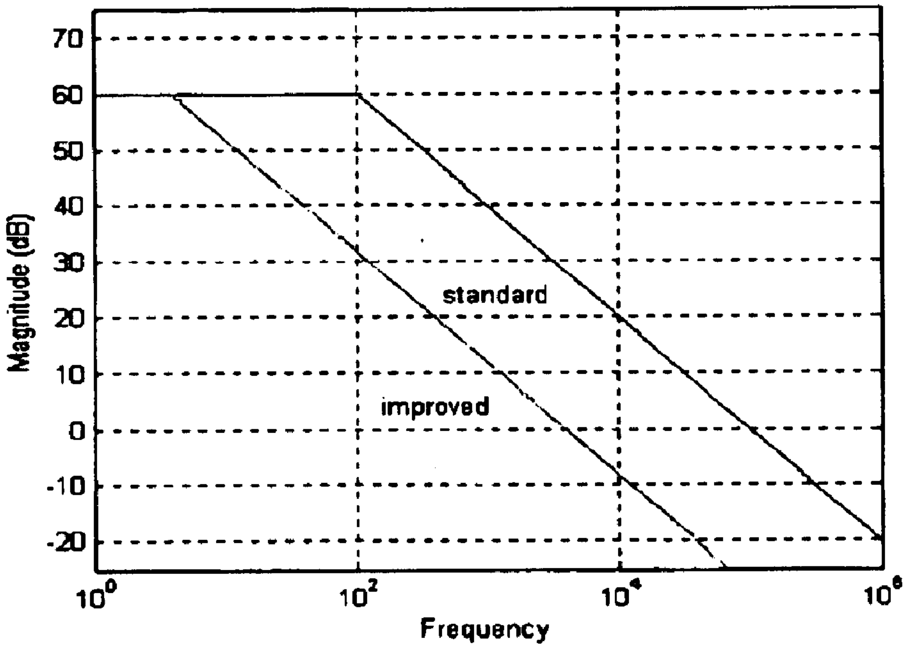
FIG. 5 illustrates the performance of a conventional integrator and a long time constant integrator in accordance with the present invention using similar component values.

FIG. 5 illustrates the performance of the conventional integrator and the long time-constant integrator using similar component values and setting $\epsilon=0.05$. As a result, the unity gain frequency of the long time-constant integrator is shifted to a much lower frequency. The setting for E is small, however, its value is generally limited by the precision of the components used.

The long time-constant integrator uses an array of matched resistors—a strong suit of monolithic circuits—to significantly lower the integrating currents in a differential integrator and dramatically increase its effective time constant. Furthermore, the long time-constant integrator constructed in accordance with the present invention operates continuously, thereby avoiding switching effects and other problems common to switched-capacitor circuits.

The embodiments described herein are illustrative of the present invention and are not intended to limit the scope of the invention to the particular embodiments described. Accordingly, while one or more embodiments of the invention have been illustrated and described, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A differential integrator with a long time constant, comprising:

- a differential operational amplifier;
- a capacitor coupled between a noninverting output terminal and an inverting input terminal of the amplifier; and
- a resistor array connecting differential input voltages to inverting and noninverting inputs of the differential operational amplifier, the resistor array comprising:
  - a first resistor connecting from a positive input of the integrator to the inverting input of the operational amplifier;
  - a second resistor connecting a negative input of the integrator to the inverting input of the operational amplifier;
  - a third resistor connecting the integrator's positive input to the noninverting input of the operational amplifier; and
  - a fourth resistor connecting the integrator's negative input to the noninverting input of the operational amplifier.

2. The differential integrator of claim 1, wherein the first and fourth, and second and third, resistors are matched.

3. A long time-constant differential integrator, comprising:

- a differential operational amplifier having inverting and noninverting amplifier input terminals, and inverting and noninverting amplifier output terminals, and wherein the amplifier output terminals form inverting and noninverting output terminals, respectively, of the differential integrator;
- a first capacitor coupled between the noninverting output terminal and the inverting input terminal of the amplifier;

a noninverting differential integrator input terminal;

an inverting differential integrator input terminal; and a resistor array connected between the noninverting differential integrator input terminal and the inverting and noninverting input terminals of the amplifier, and the resistor array is also connected between the inverting differential integrator input terminal and the inverting and noninverting input terminals of the amplifier.

4. The differential integrator of claim 3, further comprising:

a second capacitor coupled between the inverting output terminal and the noninverting input terminal of the amplifier.

5. The differential integrator of claim 4, wherein the resistor array comprises first, second, third and fourth resistors, wherein the first and fourth, and second and third, resistors are matched.

6. The differential integrator of claim 5, wherein:

the first resistor is coupled between the noninverting integrator input terminal and the inverting input terminal of the amplifier;

the second resistor is coupled between the inverting integrator input terminal and the inverting input terminal of the amplifier;

the third resistor is coupled between the noninverting integrator input terminal and the noninverting input terminal of the amplifier; and the fourth resistor is coupled between the inverting integrator input terminal and the noninverting input terminal of the amplifier.

7. The differential integrator of claim 6, wherein the first resistor ($R_1$) and the second resistor ($R_2$) have resistive values defined by $R_2 = (1+\epsilon)R_1$, and the third resistor ($R_3$) and the fourth resistor ($R_4$) have resistive values defined by $R_3 = (1+\epsilon)R_4$, and wherein a time constant parameter of the differential integrator is increased by a factor of.

$$\left[\frac{1+\varepsilon}{\varepsilon}\right].$$

* * * * *